(No Model.)
D. H. RICE.
VEHICLE WHEEL.
No. 349,746. Patented Sept. 28, 1886.
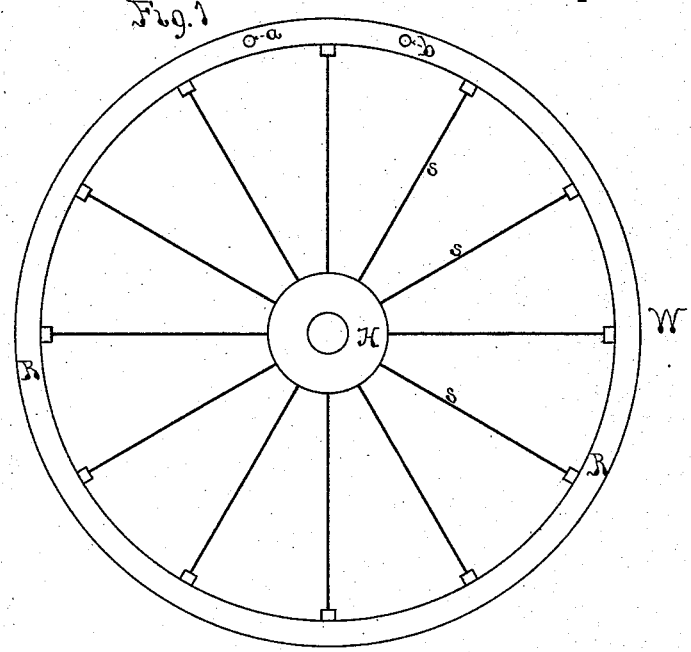
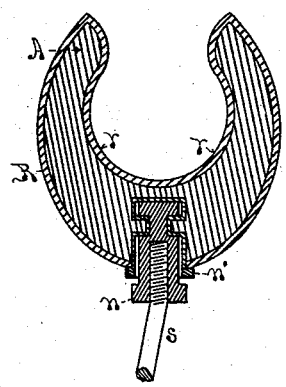 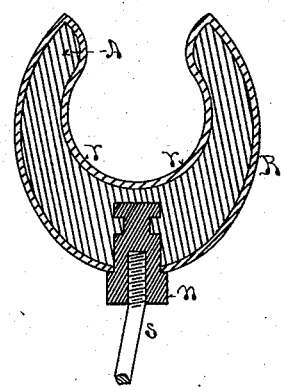 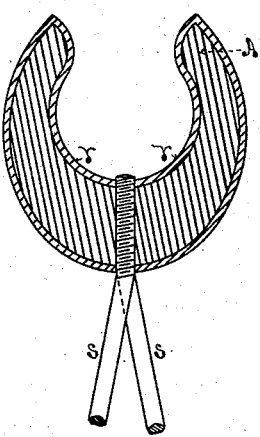
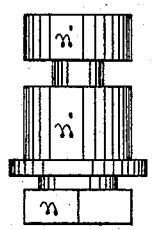 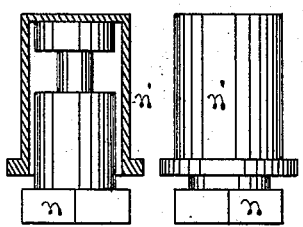 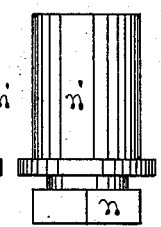
Witnesses
Wm B Brown
N. P. Ockington.
Inventor
David Hall Rice

UNITED STATES PATENT OFFICE.

DAVID HALL RICE, OF BROOKLINE, MASSACHUSETTS.

VEHICLE-WHEEL.

SPECIFICATION forming part of Letters Patent No. 349,746, dated September 28, 1886.

Application filed October 23, 1885. Serial No. 180,713. (No model.)

*To all whom it may concern:*

Be it known that I, DAVID HALL RICE, of Brookline, in the county of Norfolk and State of Massachusetts, have invented a new and useful Improvement in Vehicle-Wheels, of which the following is a specification.

My invention relates to wheels for vehicles, and especially those used in bicycles and tricycles; and it consists in certain new and improved methods of construction of the rims of such wheels, substantially as hereinafter described and claimed.

In the drawings, Figure 1 is a side view of a vehicle-wheel constructed according to my improvements. Fig. 2 is a transverse section of the rim of the same. Fig. 3 is a transverse section of the rim, showing another form of connecting the spokes. Fig. 4 is a transverse section showing another form of connecting such spokes. Figs. 5, 6, and 7 are details of the spoke-connections.

W is the wheel, which is formed with a central hub, H, and wire spokes $s\,s$, which are attached to the rim of the wheel R. This rim is made, in the ordinary and well-known way, by taking a metallic tube formed without any seam or opening longitudinally by welding or drawing without a seam and rolling it into a U shape on one side down into the curve of the other side, so as to form a hollow rim adapted to receive the tire, which, in the wheel shown, is intended to be of india-rubber. The spokes may be screwed into the rim, as shown in Fig. 4, in the ordinary manner, after which, and after the tire has been bent into the form of the rim of the wheel, I make two holes, $a\,b$, through the shell of the rim, and into one of them I pour melted sulphur or brimstone A until the hollow part of the rim is filled completely with it, the other hole allowing the air to escape as the sulphur flows in. I then allow the sulphur to set, when it will be found that it has completely filled the cavity within the seamless rim with a practically incompressible core of great rigidity capable of resisting great strains, and which prevents the rim from being bent out of shape until sufficient force is applied to it to draw out or elongate the metal of which its shell is composed upon one side thereof. The rim cannot therefore buckle or twist out of shape, and as the sulphur core is very light it does not add greatly to the weight of the wheel. The sulphur core also clings to the inner surface of the metal of the rim with great force, and serves to truss the opposite sides of the latter together, and to aid this I roll the U part of the rim out a little wider at $r\,r$ than at the top, as shown, so that the core shall clasp around the bottom of this U part and hold it firmly. As the incompressible core will hold the spokes $s\,s$ when inserted, as shown in Fig. 4, so firmly that they cannot be removed without tearing the rim in pieces, I use the constructions shown in Figs. 2, 3, 5, 6, and 7 to allow the spokes to be removed when desired. The nut $n$ is formed in the shape of a cylinder with a squared lower end, which projects inward from the rim of the wheel and allows of its being turned by a wrench. On the upper end of the nut is a bottle-necked part, as shown. A copper cylinder, $n'$, Fig. 6, is taken and placed over the cylindrical and bottle-necked parts of the nut, the latter being capable of turning freely therein, as shown in Fig. 7. Then by means of suitable dies or rollers the copper cylinder is closed inward around the bottle-neck of the nut, as shown in Fig. 5, so at to still allow the nut to turn freely, but to be secured in the cylinder longitudinally. The copper cylinder is then inserted in the hole prepared for it in the inner edge of the rim, as shown in Fig. 2, and soldered in place with hard solder. When the melted sulphur is poured into the seamless rim, as described, it surrounds the cylinder $n'$ without melting the solder, and closes firmly about its exterior, giving it the rigidity of iron, and uniting it with the shell of the rim R, so that it cannot be separated therefrom by strain on the spoke $s$. The spoke is then screwed into the nut by revolving the latter. When a spoke is used that can be revolved to screw and unscrew it, I use a nut, $n$, formed with a bottle-neck, as before, as shown in Fig. 3, and set it directly into the rim and allow the sulphur to surround it, when it will be firmly secured. Even if the nut be not bottle-necked, the sulphur will contract around it with such force that it can only be removed with difficulty.

I am aware that a felly for a vehicle-wheel has heretofore been made of a metal tube having a filling of wood or similar material, and I make no claim to such construction, the same differing from the present invention in that my core or filling is practically incompressible and cannot be condensed by the bending of the rim or felly, while wood is a compressible material, which yields or condenses not only under the pressure of the metal, but of itself in bending, and thus allows the metal-rim covering to be bent without being drawn out longitudinally.

What I claim as new and of my invention is—

1. The wheel-rim R, formed of an exterior tubular metallic shell without seam or joint longitudinally, and a core or filling of solid incompressible material filling the bore of the same, substantially as described.

2. The endless wheel-rim R, formed of an exterior tubular metallic shell without joint or seam longitudinally, and a solid core or filling of sulphur united therewith by heat, substantially as described.

3. The wheel-rim R, formed of the outer tubular metallic shell, in combination with the solid core A and the nut n, substantially as described.

4. The wheel-rim R, formed of the outer tubular metallic shell, in combination with the solid core A and the cylinder $n'$ and nut $n$, substantially as described.

5. The wheel-rim R, formed of the outer tubular metallic shell, in combination with the cylinder $n'$, secured therein, and revolving nut $n$, projecting inwardly beyond the rim, substantially as described.

DAVID HALL RICE.

Witnesses:
WILLIAM P. BLAKE,
N. P. OCKINGTON.